United States Patent
Roseman

(10) Patent No.: US 6,445,099 B1
(45) Date of Patent: Sep. 3, 2002

(54) BEARING FAILURE DETECTOR FOR ELECTRICAL GENERATOR

(75) Inventor: Ronald W. Roseman, Walton Hills, OH (US)

(73) Assignee: TRW, Inc., Lyndhurst, OH (US)

(*) Notice: Subject to any disclaimer, the term of this patent is extended or adjusted under 35 U.S.C. 154(b) by 0 days.

(21) Appl. No.: 09/568,317

(22) Filed: May 9, 2000

(51) Int. Cl.[7] ............... H02K 7/08; H02K 11/00; G08B 21/00
(52) U.S. Cl. ............... 310/90; 310/68 R; 340/682
(58) Field of Search ............... 310/90, 68 R, 310/68 B, 90.5; 340/500, 540, 679, 682, 635, 648; 384/91, 448, 456; 324/220, 230, 173, 254, 246, 545, 123

(56) References Cited

U.S. PATENT DOCUMENTS

| 1,001,152 A | | 8/1911 | Lawrence |
|---|---|---|---|
| 3,108,264 A | * | 10/1963 | Hernoo ............... 310/68 B |
| 3,176,286 A | | 3/1965 | Dschen |
| 3,508,241 A | | 4/1970 | Potter |
| 3,775,680 A | | 11/1973 | Egeland |
| 4,063,786 A | | 12/1977 | Rall |
| 4,074,575 A | | 2/1978 | Bergman et al. |
| 4,584,865 A | | 4/1986 | Hutchins |
| 4,641,978 A | | 2/1987 | Kapich |
| 5,140,311 A | | 8/1992 | Cook |
| 5,198,763 A | | 3/1993 | Konishi |
| 5,244,287 A | | 9/1993 | Yoshikawa |
| 5,385,411 A | * | 1/1995 | Shirai et al. ............... 384/446 |
| 5,602,437 A | | 2/1997 | Shahamat et al. |
| 5,998,894 A | * | 12/1999 | Raad ............... 310/68 B |
| 6,100,809 A | * | 8/2000 | Novoselsky et al. ........ 340/682 |

FOREIGN PATENT DOCUMENTS

| GB | 441837 A | 10/1934 |
|---|---|---|
| GB | 1153413 A | 5/1969 |
| GB | 1207348 A | 9/1970 |
| GB | 1277245 A | 6/1972 |
| GB | 1501691 A | 2/1978 |
| GB | 1572281 A | 7/1980 |
| JP | 3-4018 A | 1/1991 |
| SU | 727886 T | 4/1980 |
| SU | 1307115 A1 | 4/1987 |
| SU | 1580064 A1 | 7/1990 |

* cited by examiner

Primary Examiner—Tran Nguyen
(74) Attorney, Agent, or Firm—Rankin, Hill, Porter & Clark LLP

(57) ABSTRACT

A bearing failure detector for an electrical generator includes a disc located within the bearing assembly near the location of the main bearings. The disc has a central opening through which the shaft extends, and the disc includes a thin, electrically conductive ring which is plated or formed as a film inside the central opening. The ring is exposed to the shaft along inside diameter of the detector disc adjacent to the periphery of the shaft, but a gap is normally provided around the shaft when the shaft is properly supported by the main bearings, so that the shaft does not contact the ring unless the bearings are significantly worn. The ring provides a closed circuit, and it is connected to a control circuit which monitors the closed circuit at all times. When the internal clearance of the main bearings has been enlarged by a predetermined amount, the ring contacts the shaft, causing the thin ring to be quickly worn away. This causes an open circuit through the detector, which is sensed by the control circuit to provide an indication that the bearings need replacement. The closed circuit in the detector provides a positive indication that the detector is operating as well as an indication of bearing function. In addition, the open circuit produced by the main bearing failure is continuous rather than intermittent and is easily sensed.

20 Claims, 3 Drawing Sheets

BEARING FAILURE DETECTOR FOR ELECTRICAL GENERATOR

BACKGROUND OF THE INVENTION

1. Field of the Invention

This invention relates to electrical generators, and more particularly to generators having bearings for supporting the rotor shaft and to a system for detecting the imminent failure of such bearings and the need for bearing replacement.

2. Description of the Prior Art

In electrical generators, such as those used to power the electrical systems of aircraft, the generator is connected to the main engine by a drive shaft. The drive shaft is connected to the rotor assembly through the rotor shaft The rotor assembly is mounted on the rotor shaft and rotates within the stator assembly. The rotor shaft is supported for rotation in the generator housing using sealed bearing assemblies comprising grease lubricated ball bearings. In the course of normal generator operation, the bearings are subject to wear. Eventually, the bearings can wear sufficiently that bearing failure can occur, causing the generator to stop functioning. If the generator stops functioning, the aircraft electrical system may not operate.

In order to prevent bearing failure and to maintain proper operation of the generator, the bearings were usually replaced at predetermined service intervals. The bearing replacement intervals were determined based upon worst-case scenarios of bearing wear, and the bearings were scheduled for replacement before any reasonable possibility of bearing failure could occur. As a result, the bearings were usually replaced long before they were actually worn out, and generators were disassembled and serviced unnecessarily before there is any immediate need for bearing replacement. This resulted in unnecessary servicing, cost and equipment downtime. In addition, it is still possible for bearings to fail before schedule service, and if this occurs, the electrical system failure on the aircraft can be serious.

These problems have been overcome in part by the bearing failure detector described in U.S. Pat. No. 5,602,437, which discloses a conductive ring having an internal opening approximately the same size as the auxiliary bearing clearance. The ring is connected through a lead wire to a control unit. When the main bearings fail, the shaft contacts this ring, and, since the shaft is grounded, the control unit senses that the ring is grounded, indicating bearing failure.

While the bearing failure detector of U.S. Pat. No. 5,602,437 provides a much needed indication of bearing failure, there are still several problems with this detector. The signal produced by the detector is temporary and intermittent, since it depends upon the contact of the shaft with the detector, and the shaft wears away the detector's conductive ring. When the ring is sufficiently worn, the generator shaft, now supported by the auxiliary bearings, no longer contacts the detector, and the failed bearing signal ceases.

Furthermore, the bearing failure detector of U.S. Pat. No. 5,602,437 does not provide any indication that the detector is actually working. The lack of a ground signal could mean that the main bearings have not failed, but it could also mean that the detector itself has failed. The absence of a ground signal, therefore, does not provide positive evidence of proper bearing operation.

SUMMARY OF THE INVENTION

The present invention provides an improved onboard means for determining whether bearing failure is about to occur in aircraft generators so that proper bearing replacement can be undertaken when necessary. Using the present invention, a signal is provided when the main bearings are operating properly an d when the bearing failure detector is operating properly. Thus, the present invention provides a positive indication that the bearing failure detectors are operating properly prior to bearing failure.

The bearing failure detector of the present invention also provides a continuous signal indicating bearing failure rather than a temporary or intermittent signal. This allows for a more reliable detection of bearing failure than was possible with intermittent signals of the prior art.

The bearing failure detector of the present invention provides an improved bearing failure signal which eliminates the need for automatic scheduled replacement of bearings according to a maintenance schedule that may not reflect the need for actual bearing replacement or may not catch a bearing failure before it occurs. The bearing failure detector allows the bearings to operate until they are close to failure, at which time the detector provides a positive indication that the bearings are about to fail and must be replaced within a certain number of hours of operation. This indication may be in the form of a signal to the cockpit to inform the pilot of the need for bearing replacement.

After the bearing replacement indication is provided, the present invention allows the shaft to ride upon the auxiliary bearings until the bearing assemblies are replaced. The auxiliary bearings have a slight gap between their inside diameter and the rotor shaft and are only used when the main bearings have worn to the point that their internal clearances have sufficiently enlarged to equal this gap.

The bearing failure detector of the present invention includes a disc located within the bearing liner next to the auxiliary bearings and near the location of the main bearings. A thin metal ring is plated or formed as a film on the inside diameter of the disc. The ring has a space or gap, so that it is discontinuous around the inner circumference of the disc, and a pair of leads are connected to the ring, one lead on each side of the space or gap. A closed circuit is thus formed through the two leads and around the ring, and is present before the bearing has failed and while the detector is operating properly. This closed circuit is monitored by a control circuit at all times and is used as a bearing function signal, indicating that the bearings are operating properly and supporting the shaft. The ring is exposed along inside diameter of the detector disc, but a gap is normally provided between the shaft and the ring when the shaft is being properly supported by the main bearings, so that the shaft does not contact the ring unless and until the bearings are significantly worn.

During operation, as the main bearings are approaching failure, the main generator shaft will move within the increased internal clearance of the bearings. Eventually, the shaft will rub against the detector disc, and it will quickly rub through a portion of the thin metal ring on the inside of the disc. This will create an open circuit, which is monitored by the control circuit. The control circuit will sense this open circuit as an interruption of the bearing function signal, and will send the appropriate signal to the cockpit. At this time, the generator shaft will be supported by auxiliary bearings, and any further deterioration of the machine operation will be prevented. As the bearings continue to wear, the open circuit will remain, providing a continuous bearing failure signal.

These and other advantages are provided by the present invention of an electrical generator which comprises a housing assembly, and a stator assembly which is fixedly mounted with respect to the housing assembly. A bearing assembly is supported by housing assembly, and the bearing assembly includes main bearings having an internal clearance. A shaft is supported for rotation in the bearing assembly and extends through the housing assembly. A rotor assembly is mounted on the shaft for rotation therewith inside the stator assembly. A bearing failure detector is mounted adjacent to the bearing assembly. The detector senses an enlargement in the internal clearance of the main bearings by a predetermined amount, which enlargement indicates the need for replacement of the bearings.

DETAILED DESCRIPTION OF THE PREFERRED EMBODIMENT

Figure 1:
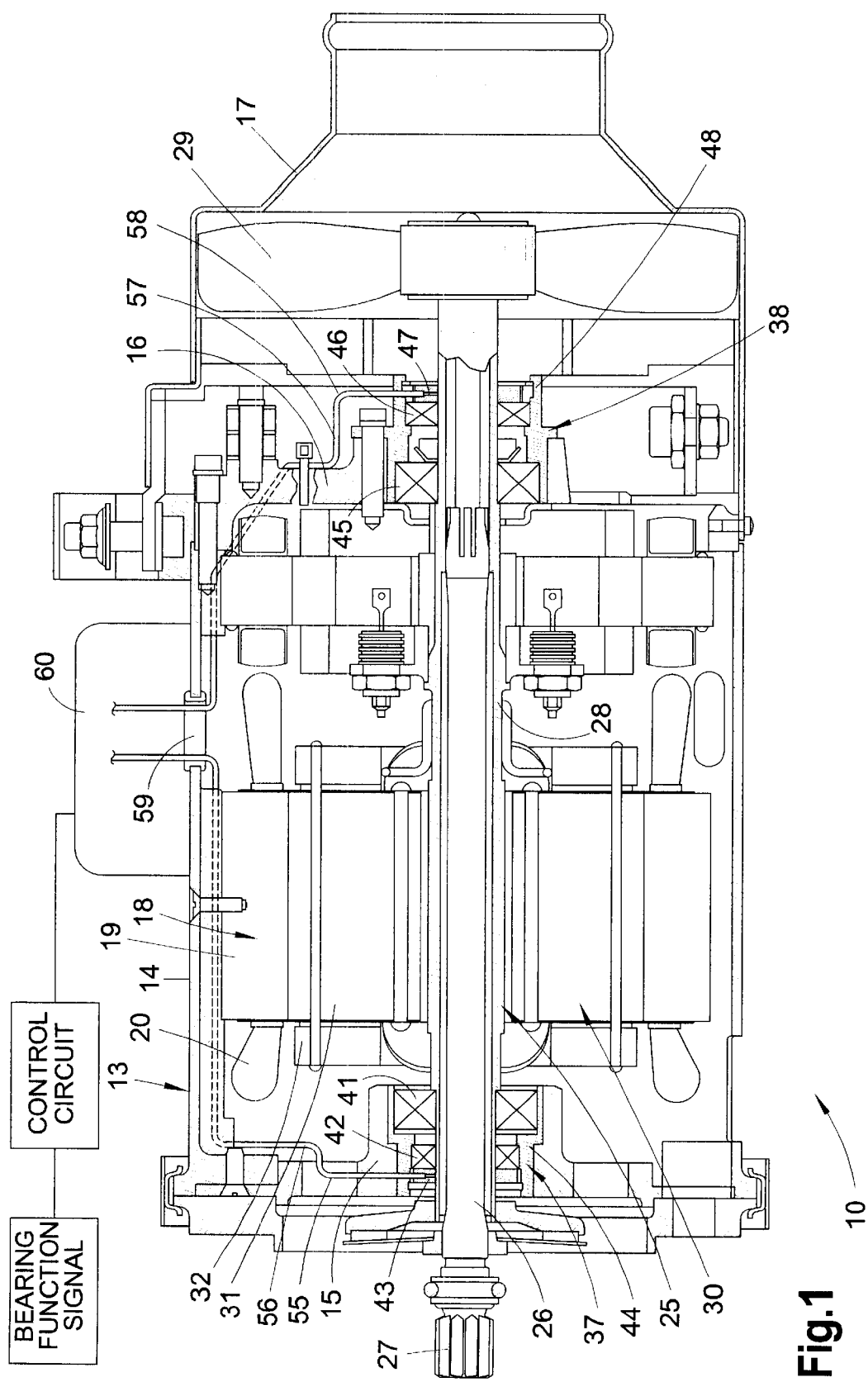
FIG. 1 is a side sectional view of a generator having the bearing failure detector of the present invention.
Figure 1A:
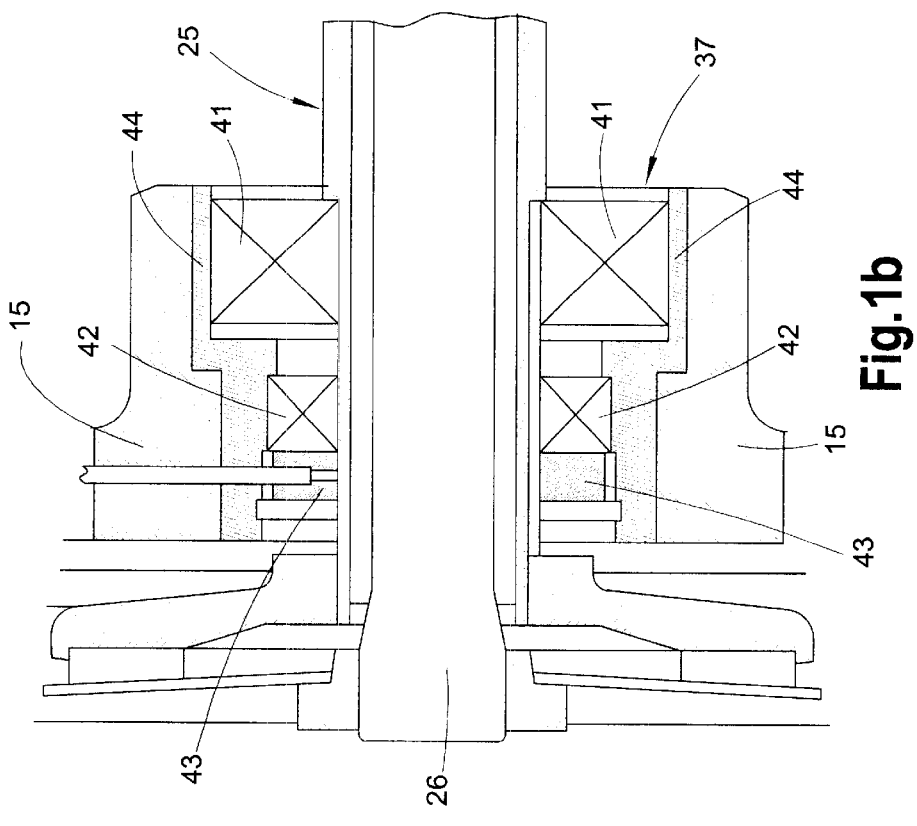
Figure 1B:
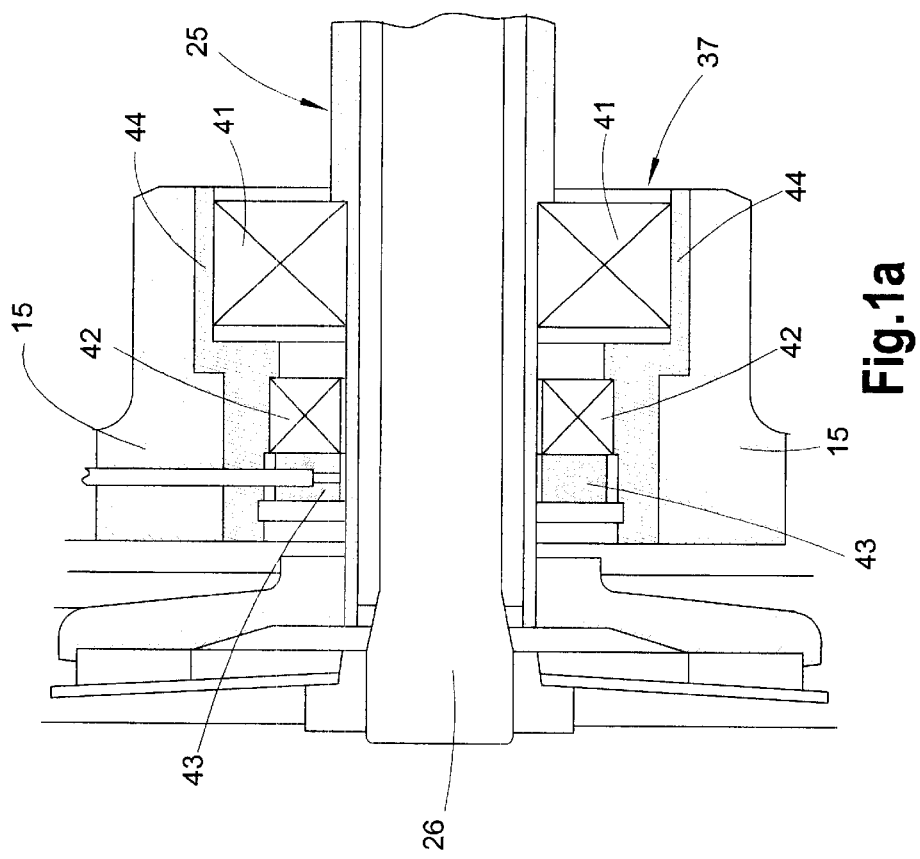
Figure 4:
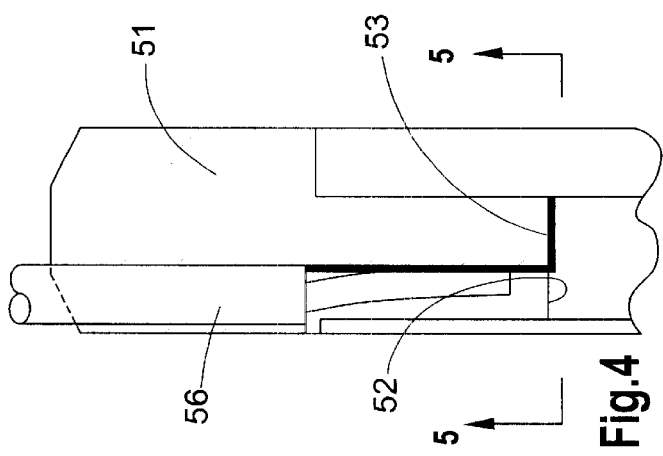
FIG. 4 is detailed side sectional view of a portion of one of the bearing failure detectors of FIG. 2.

Referring more particularly to the drawings and initially to FIG. 1, there is shown a generator 10 incorporating the present invention. The generator 10 is a DC generator of the type generally used in many aircraft. The housing, stators and rotors of the generator 10 are essentially the same as those in a Model 30086-011 generator available from TRW Aeronautical Systems (Lucas Aerospace), of Aurora, Ohio. For the purpose only of convenience in describing the generator 110, the left end of the generator as shown in FIG. 1 will be referred to as the front end, and the right end of the generator as shown in FIG. 1 will be referred to as the rear end.

The generator 10 includes a housing assembly 13 comprising an outer cylindrical housing member 14, a front end cover assembly 15 attached to one end of the housing member 14, a rear end hub 16 attached to the other end of the housing member 14, and a fan cover 17 extending from the rear of the generator beyond the rear end hub 16. A stator assembly 18 is mounted to the inside of the cylindrical housing member 14. The stator assembly 18 comprises a stator core 19 and stator windings 20.

The generator is driven by a rotatable shaft assembly 25 which extends through the housing assembly 13. The shaft assembly 25 comprises a drive shaft 26 which has a spline 27 at the front end for attachment to the main drive of the engine gear box. The shaft assembly 25 also comprises a rotor shaft 28 at the rear end of which is mounted a fan 29 is mounted for cooling the generator. The fan 29 is enclosed by the fan cover 17. As seen in FIG. 1, the drive shaft 2 extends through the hollow interior of the rotor shaft 28, and both shafts components 26 and 28 is connected to rotate together. A rotor assembly 30 is mounted on the rotor shaft 28 for rotation therewith. The rotor assembly 30 comprises a rotor core 31 and rotor windings 32.

Except as described below, most of the other elements of the generator 10 are known and need not be described herein in further detail, since they are not important to the function of the present invention.

A generator control unit (not shown) may be provided for controlling the operations of the generator 10. The function and design of a suitable generator control unit for use with the present invention are described in more detail in U.S. Pat. No. 5,583,420, which is assigned to the assignee of the present invention, and the disclosure of which is hereby incorporated by reference in its entirety.

The shaft assembly 18 is held in place within the housing assembly 13 by a pair of bearing assemblies 37 and 38. The front bearing assembly 37 is contained within a portion of the front end cover assembly 15. The rear bearing assembly 38 is contained within a portion of the rear end hub 16.

The front bearing assembly 37 comprises main bearings 41, auxiliary bearings 42 located next to the main bearings 41, a bearing failure detector 43, along with conventional springs, pins and nuts as shown in FIG. 1. The front bearing assembly 37 also comprises a bearing liner 44 within which the other elements of the assembly are mounted. The rear bearing assembly 38 comprises main bearings 45, auxiliary bearings 46 located next to the main bearings 45, a bearing failure detector 47, along with conventional springs, pins and nuts. The rear bearing assembly 38 also comprises a bearing liner 48 within which the other elements of the assembly are mounted. The auxiliary bearings 42 and 46 have a slight annular gap between their inside diameter and the outside diameter of the rotor shaft 28, so that the auxiliary bearings 42 and 46 will not normally contact the shaft 28 while the shaft is properly centered in the main bearings and the main bearings are not excessively worn. The auxiliary bearings 42 and 46 will only contact the shaft 28 when the main bearings 41 and 45 have worn beyond a predetermined limit and are close to failure as will be described more fully later.

Both of the bearing failure detectors 43 and 47 are essentially the same and both will be described with reference to the bearing failure detector 43 shown in FIGS. 2–5. As shown particularly in FIG. 2, the bearing failure detector 43 comprises a disc 51 made of an electrically insulating material, such as plastic, ceramic, or a composite material, such as glass fiber reinforced polyetheretherketone. The disc has a central opening 52, within which is a conductive ring 53. The ring 53 is plated or formed as a film on the inside of the central opening 52, and is made of a highly conductive material, such as copper. The inside diameter of the ring 53 inside the central opening 52 of the detector 43 is slightly greater than the outside diameter of the shaft 28, so that when the shaft is properly centered in the main bearings 41, the shaft will not touch the metal ring 53. The inside diameter of the ring 53 inside the central opening 52 is also approximately the same as the inside diameter of the auxiliary bearings 42, so that the shaft 28 can be supported by the auxiliary bearings if it is capable of touching the detector 43.

Figure 5:
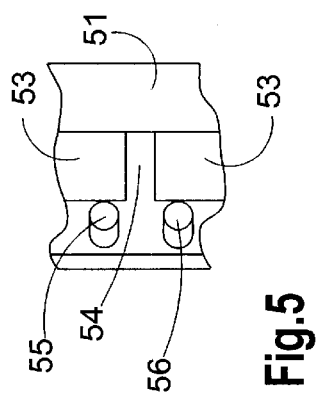
FIG. 5 is a sectional view taken along line 5—5 of FIG. 4
Figure 3:
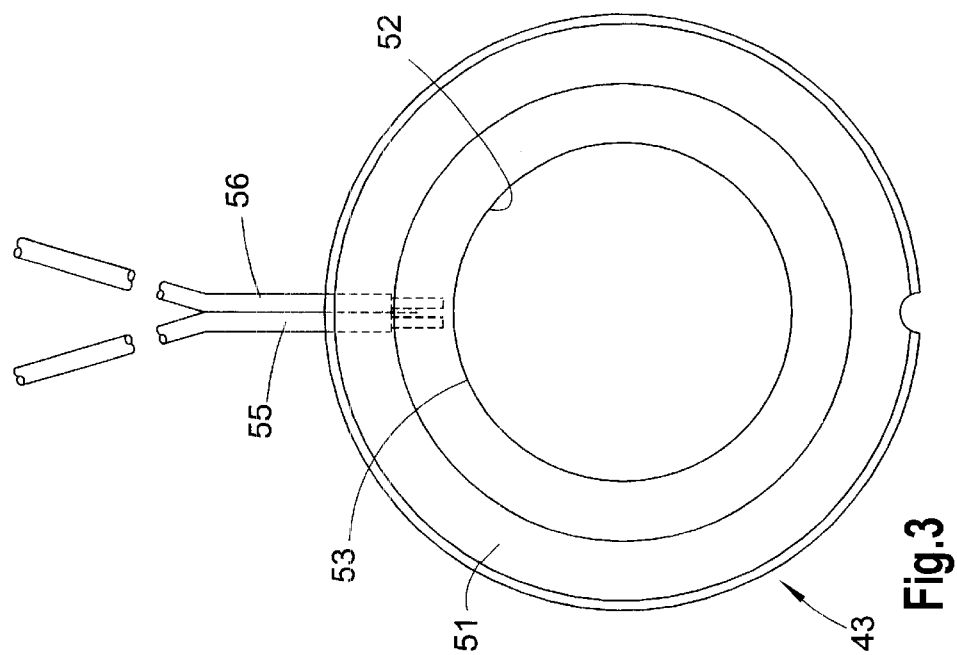
FIG. 3 is an end elevational view of the bearing failure detector of FIG. 2.
Figure 2:
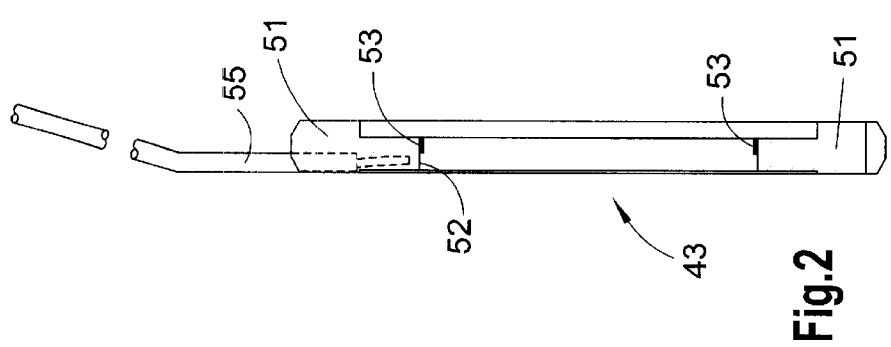
FIG. 2 is a side sectional view of one of the bearing failure detectors of FIG. 1 to a larger scale.

As shown in FIG. 5, the ring 53 has a space or gap 54, so that the ring does not extend completely around the inside of the central opening 52. A pair of lead wires 55 and 56 is connected to the metal ring 53 on either side of the gap 54 by suitable means, such as by brazing. The lead wires 55 and 56 are encased in the insulating disc 51. A closed circuit is thus formed from one lead wire 55, around the metal ring 53 to the other lead wire 56. The disc 51 electrically insulates the ring 53 from the other elements of the generator.

As shown in FIG. 1, the lead wires 55 and 56 from the bearing failure detector 43 as well as the corresponding lead wires 57 and 58 from the other bearing failure 15 detector 47 extend through an opening 59 in the cylindrical housing member 14 to a connector enclosure 60, along with other wires (not shown) from the operative generator components, such as the main stator and the exciter or assemblies. The connector enclosure 60 is, in turn connected to the generator control unit.

In operation, with the main bearings 41 and 45 functioning and properly supporting the rotor shaft 28, the shaft rotates concentrically within the auxiliary bearings 42 and 46 forming a small gap therebetween, and the shaft rotates concentrically within the central openings in the detectors 43 and 47. The gap between inside diameter of the auxiliary bearings 42 and 46 and the outside of the shaft 28 is dimensioned so as to be great enough so that only the main bearings support the shaft, and the shaft does not contact the auxiliary bearings. Likewise, the gap between the central opening 52 in the detectors 43 47 and the inside diameter of the main bearings 41 and 45 is dimensioned so as to be great enough so that the shaft 28 does not touch the detectors, and the closed circuit through the detectors is maintained, and a "bearing function" signal is sent to the generator control unit, indicating that the main bearings are functioning properly to support the shaft.

When the main bearings 41 and 45 have worn significantly, the internal clearance of the main bearings increases. This allows the shaft 28 to contact the bearing failure detectors 43 and 47. When the shaft 28 contacts the disc 51 of one of the detectors 43 and 47, it quickly wears through the thin conductive ring which has been plated or formed as a film on the inside of the disc. As a result, an open circuit is formed between the two lead wires. Since the ring 53 is connected to the generator control unit through the connector enclosure 60 by the lead wires 54 and 55, the generator control unit monitors the open circuit, and thus detects that the "bearing function" signal has ceased, meaning that the main bearings 41 and 45 have worn to the point that the shaft 28 can contact the detectors 43 and 47. This indicates that it is time to replace the main bearings 41 and 45. The open circuit sensed by the generator control unit may be used to send a signal to the cockpit to advise the pilot that the main bearings 41 and 45 must be replaced within a predetermined period of time, such as 20 hours of operation. The generator 10 can continue to operate on the auxiliary bearings 42 and 46, until the main bearings 41 and 45 are replaced.

Unlike the bearing failure detectors of U.S. Pat. No. 5,602,437, the bearing failure detectors 43 and 47 of this invention provide a continuous bearing failure signal to the generator control unit 34 once the shaft 28 has reached the auxiliary bearings 42 and 46, since the detectors produce a continuous open circuit signal when the shaft has come in contact with the detector ring 53 and has worn an opening in the ring. The detectors 43 and 47 maintain this open circuit signal as sensor wear continues. Sensor integrity can be verified at any time prior to bearing failure by determining that a closed circuit exists through each detector. These closed circuit signals not only indicate that the main bearings 41 and 45 have not failed, but also indicate that the bearing failure detectors 43 and 47 are operating properly.

The bearing failure detectors 43 and 47 allow operation of the generator 10 until the bearing assemblies are near failure and avoid the necessity for periodic scheduled bearing replacement which may be otherwise unnecessary. The detectors 43 and 47 and the auxiliary bearings 42 and 46 also allow the generator to operate safely for a sufficient period of time after a replacement indication has been provided by the detectors to allow replacement of the bearing assembly.

While the bearing failure detectors 43 and 47 operate as described to detect failure of the main bearings, they also operate in a similar manner in the event of failure or excessive wear of the bearing liners 44 or 48. If either of the bearing liners 44 or 48 wears excessively at the location at which the main bearings 41 or 45 are supported, the main bearings will move radially outwardly away from the shaft 28, causing the shaft to contact the auxiliary bearings 42 and 46 as well as to contact the bearing failure detectors. This contact will cause the shaft 28 to contact one or both of the bearing failure detectors 43 and 47, wearing through the thin conductive ring on the inside of the disc. The open circuit is thus formed between the two lead wires of the detector, and the cessation of "bearing function" signal is detected by the generator control unit.

Although the structure and operation of the present invention has been described with reference to a generator control unit such as that described fully in U.S. Pat. No. 5,583,420, it should be understood that such a generator control unit is not necessary for the operation of this invention, and the use of the generator control unit is included in the description so as to illustrate a preferred form of the invention and to show another of the advantages of the generator control unit disclosed in U.S. Pat. No. 5,583,420. The invention can also operate using any suitable circuit which measures resistance, current or electrical potential and thereby senses that the detector disc has contacted the shaft, and which then provides a suitable warning signal as a result of such measurement.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

REFERENCE NUMBERS 10 generator
11
12
13 housing assembly
14 cylindrical housing member
15 front end cover assembly
16 rear end hub
17 fan cover
18 stator assembly
19 stator core
20 stator windings
21
22
23
24
25 shaft assembly
26 drive shaft
27 spline
28 rotor shaft
29 fan
30 rotor assembly
31 rotor core
32 rotor windings
33
34
35
36

37 front bearing assembly
38 rear bearing assembly
39
40
41 front main bearings
42 front auxiliary bearings
43 front bearing failure detector
44 front bearing liner
45 rear main bearings
46 rear auxiliary bearings
47 rear bearing failure detector
48 rear bearing liner
49
50
51 disc
52 central opening
53 ring
54 gap
55 first front lead wire
56 second front lead wire
57 first rear lead wire
58 second rear lead wire
59 opening
60 connector enclosure
61
62

What is claimed is:

1. An electrical generator which comprises:

a housing assembly;

a stator assembly fixedly mounted with respect to the housing assembly;

a bearing assembly supported by housing assembly, the bearing assembly including main bearings having an internal clearance between the main bearings;

a shaft supported for rotation in the bearing assembly and extending through the housing assembly and through the internal clearance in the main bearings;

a rotor assembly mounted on the shaft for rotation the therewith inside the stator assembly; and a bearing failure detector mounted adjacent to the bearing assembly, the bearing failure detector providing a bearing function signal indicating that the bearing assembly is properly operating and that the internal clearance of the main bearings has not become enlarged by a predetermined amount, the detector ceasing the provision of the bearing function signal upon sensing an enlargement in the internal clearance of the main bearings by a predetermined amount, which enlargement indicates the need for replacement of the bearing assembly.

2. An electrical generator as recited in claim 1, where in the bearing failure detector comprises a conductive ring which encircles the shaft.

3. An electrical generator as recited in claim 2, wherein the ring contacts the shaft when the internal clearance of the main bearings has been enlarged by the predetermined amount.

4. An electrical generator as recited in claim 2, wherein the ring is worn partially away to create an open circuit when contacted by the shaft.

5. An electrical generator as recited in claim 4, wherein the detector comprises in addition a disc having a central opening, the ring being formed inside the central opening where the disc is capable of directly contacting the shaft.

6. An electrical generator as recited in claim 2, comprising in addition means for connecting the detector to a control circuit to electrically sense contact of the ring by the shaft.

7. An electrical generator as recited in claim 2, comprising in addition means for connecting the detector to a control circuit to electrically sense an open circuit caused by contact of the ring by the shaft.

8. An electrical generator as recited in claim 1, wherein the bearing failure detector ceases providing the bearing function signal when it is contacted by the shaft.

9. An electrical generator as recited in claim 1, wherein the shaft has an outside diameter, and wherein the bearing assembly also includes auxiliary bearings which have an inside diameter which is larger than the outside diameter of the shaft.

10. A bearing failure detector for mounting on a shaft, which comprises:

a disc having an inner opening;

a conductive ring within the inner opening of the disc, the ring providing a closed circuit; the ring capable of being contacted by the shaft upon failure of main bearings, the closed circuit being opened by contact with the shaft thereby creating an open circuit;

means for connecting the ring to a control circuit to determine if the ring has contacted the shaft through opening of the closed circuit provided by the ring.

11. A bearing failure detector as recited in claim 10, comprising in addition auxiliary bearings for supporting the shaft when the shaft contacts the ring.

12. An electrical generator which comprises:

a housing assembly;

a stator assembly fixedly mounted with respect to the housing assembly;

a bearing assembly supported by housing assembly, the bearing assembly including main bearings having an internal clearance between the main bearings;

a shaft supported for rotation in the bearing assembly and extending through the housing assembly and through the internal clearance in the main bearings;

a rotor assembly mounted on the shaft for rotation therewith inside the stator assembly; and a bearing failure detector mounted adjacent to the bearing assembly, the bearing failure detector providing a bearing function signal indicating that the bearing assembly is properly operating, the detector ceasing the provision of the bearing function signal upon sensing an enlargement in the internal clearance of the main bearings by a predetermined amount, which enlargement indicates the need for replacement of the bearing assembly, the bearing failure detector including a closed circuit which is used to provide the bearing function signal, the closed circuit opening when the internal clearance of the main bearings has enlarged by the predetermined amount.

13. An electrical generator as recited in claim 12, wherein the bearing failure detector comprises a conductive ring which encircles the shaft.

14. An electrical generator as recited in claim 13, wherein the ring contacts the shaft when the internal clearance of the main bearings has been enlarged by the predetermined amount.

15. An electrical generator as recited in claim 13, wherein the ring is worn partially away to create an open circuit when contacted by the shaft.

16. An electrical generator as recited in claim 15, wherein the detector comprises in addition a disc having a central opening, the ring being formed inside the central opening where the disc is capable of directly contacting the shaft.

17. An electrical generator as recited in claim 13, comprising in addition means for connecting the detector to a control circuit to electrically sense contact of the ring by the shaft.

18. An electrical generator as recited in claim 13, comprising in addition means for connecting the detector to a control circuit to electrically sense an open circuit caused by contact of the ring by the shaft.

19. An electrical generator as recited in claim 12, wherein the bearing failure detector ceases providing the bearing function signal when it is contacted by the shaft.

20. An electrical generator as recited in claim 12, wherein the shaft has an outside diameter, and wherein the bearing assembly also includes auxiliary bearings which have an inside diameter which is larger than the outside diameter of the shaft.

* * * * *